(12) United States Patent
Stemmle et al.

(10) Patent No.: US 8,954,126 B2
(45) Date of Patent: Feb. 10, 2015

(54) SUPERCONDUCTING DIRECT-CURRENT ELECTRICAL CABLE

(75) Inventors: Mark Stemmle, Hannover (DE); Erik Marzahn, Langenhagen (DE)

(73) Assignee: Nexans, Paris (FR)

( * ) Notice: Subject to any disclaimer, the term of this patent is extended or adjusted under 35 U.S.C. 154(b) by 65 days.

(21) Appl. No.: 13/028,443

(22) Filed: Feb. 16, 2011

(65) Prior Publication Data
US 2011/0294669 A1 Dec. 1, 2011

(30) Foreign Application Priority Data
Mar. 4, 2010 (EP) .................................... 10305216

(51) Int. Cl.
H01L 39/24 (2006.01)
H01B 12/06 (2006.01)
H01B 12/16 (2006.01)

(52) U.S. Cl.
CPC ................ *H01B 12/06* (2013.01); *H01B 12/16* (2013.01); *Y02E 40/642* (2013.01)
USPC ....................................................... 505/230

(58) Field of Classification Search
USPC .......................................................... 505/230
See application file for complete search history.

(56) References Cited

U.S. PATENT DOCUMENTS

| 3,643,002 | A | * | 2/1972 | Minnich | 174/15.5 |
| 4,463,547 | A | * | 8/1984 | Young | 57/6 |
| 2002/0035039 | A1 | * | 3/2002 | Nassi et al. | 505/100 |
| 2003/0040439 | A1 | * | 2/2003 | Castiglioni et al. | 505/100 |
| 2009/0251257 | A1 | * | 10/2009 | Stelzer et al. | 335/300 |
| 2010/0179064 | A1 | | 7/2010 | Willen et al. | |

FOREIGN PATENT DOCUMENTS

| EP | 0451864 | * | 10/1991 | H01B 12/00 |
| WO | 2008148390 | | 12/2008 | |

* cited by examiner

*Primary Examiner* — Paul Wartalowicz
(74) *Attorney, Agent, or Firm* — Sofer & Haroun, LLP

(57) ABSTRACT

A superconductive electrical direct current cable with at least two conductors insulated relative to each other is indicated, where the cable is placed with at least two conductors insulated relative to each other, where the conductors are arranged in a cryostat suitable for guidance of the cooling agent, wherein the cryostat is composed of at least one metal pipe which is surrounded by a circumferentially closed layer with thermally insulating properties. In the cryostat is arranged a strand-shaped carrier composed of insulating material, where the carrier has at least two diametrically oppositely located outwardly open grooves in each of which is arranged one of the conductors. Each conductor is composed of a plurality of superconductive elements.

9 Claims, 1 Drawing Sheet

SUPERCONDUCTING DIRECT-CURRENT ELECTRICAL CABLE

RELATED APPLICATION

This application claims the benefit of priority from European Patent Application No. 10 305 216.3, filed on Mar. 4, 2010, the entirety of which is incorporated by reference.

BACKGROUND

1. Field of the Invention

The invention relates to a superconductive electric direct current cable.

Such a cable is disclosed in WO 2008/148390 A1

2. Description of Related Art

In today's technology, superconductive cables include electric conductors of a composite material which includes ceramic material that changes into the superconductive state when the temperature is sufficiently low. The electric direct current resistance of an appropriately constructed conductor is zero when cooled appropriately, as long as a certain current strength is not exceeded. Suitable ceramic materials are, for example, BSCCO (Bismuth-Strontium-Calcium-Copper-Oxide) as material of the first generation, or ReBCO (Rare-earth-Barium-Copper-Oxide), particularly YBCO (Yttrium-Barium-Copper-Oxide), as material of the second generation. Sufficiently low temperatures for bringing these types of materials into the superconductive state are between 67 K and 90 K. Suitable cooling agents are, for example, Nitrogen, Helium, Neon and Hydrogen or mixtures of these materials.

A direct current cable, in the following called "cable", as they are described hereinabove, may, for example, be used as a current supply cable on ships or as connecting cable between points of intersection within a transmission network as well as a connecting cable between different transmission networks. The cable can be, for example, an arrangement for a high-voltage direct current transmission (HVTCT), which can be used for bridging longer distances, for example, as sea cable. Compared to superconductive alternating current cables, superconductive direct current cables have the advantage that there are no electric direct current losses. In addition, the direct current cables are not burdened with charging currents and there are no undesired inductive voltage drops.

The above-mentioned WO 2008/148390 A1 discloses a two-phase electric cable for the current supply of users of electrical current. The cable is constructed as a superconductive cable with two-phase conductors which are combined with each other to form a unit by an inner dielectric and are combined into unit by an inner dielectric from each other. The cable is arranged in a cryostat which is composed of two concentric tubes between which a vacuum insulation is arranged. The cooling agent for producing the superconductive state of the phase conductors is conducted through the cryostat. The cooling of such a cable is problematic because the dielectric constitutes a thermal insulation for the cooling of the superconductive phase conductor.

OBJECTS AND SUMMARY

The invention is based on the object of constructing the above-described cable in such a way that in a simplified construction a good cooling of the superconductive conductor is possible.

This cable is of simple and compact construction. Each conductor is composed of a plurality of superconductive elements which are located in the outer area of the support, so that these elements or their respective conductors are cooled directly by a cooling agent moved through the cryostat. The number of superconductive elements is easily changeable, so that the cable can be adapted in a simple manner to different current strengths with an appropriately variable requirement of superconductive materials. The construction of the cable can be changed in the manner of a module by a different number of grooves in which a respective plurality of superconductive elements are accommodated. An increased number of grooves is always a whole number multiple of "2". The external magnetic field of the cable is minimized by the spatial proximity of the conductors. The cable is in its totality thermally insulated by the cryostat.

In a preferred embodiment, the grooves extend in the longitudinal direction of the support helically around the support.

Embodiments of the subject matter of the invention are illustrated in the drawings.

DETAILED DESCRIPTION

Figures 1, 2:
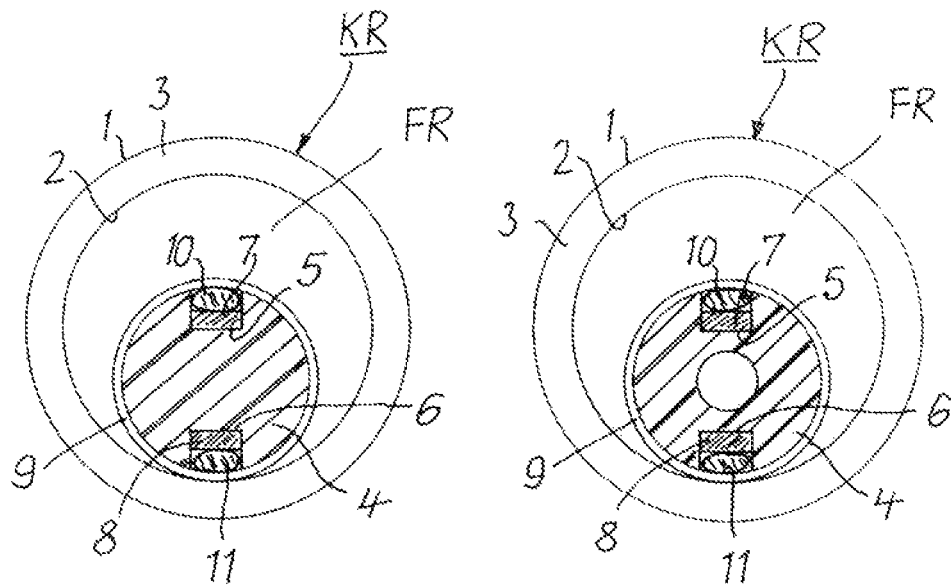
FIG. 1 shows a cable according to the invention arranged in a cryostat.
FIG. 2 shows an embodiment of the cable modified as compared to FIG. 1.

In FIGS. 1 and 2 of the drawing, the superconductive cable according to the invention is illustrated with always only two conductors. There also may be more conductors, always with a whole number multiple of "2".

In the embodiment according to FIG. 1, a cryostat KR is illustrated which is composed of two metal pipes 1 and 2 which are arranged coaxially relative to each other. A vacuum insulation 3 exists between the pipes. The cryostat KR could also be of a different configuration if it is ensured that the space surrounded by the cryostat is effectively protected against a heat application from outside. In the cryostat KR is arranged as a part of the cable a strand-shaped carrier 4 composed of insulating material which leaves relative to the inner pipe 2 of the cryostat KR a free space FR for conducting a cooling agent therethrough. In operation, the insulating material of the carrier 4 must be stable at the low temperature of the cooling agent. As discussed above, the appropriate temperature is, for example, between 67 K and 90 K. A suitable insulating material is, for example, polytetrafluoroethylene.

The carrier 4 is illustrated with a circular cross section. However, the carrier form may also have a different cross sectional shape, for example, a polygonal shape. In the carrier 4, two outwardly open grooves 5 and 6 are provided which are located diametrically opposite each other. They advantageously extend helically around the carrier 4.

Arranged in the grooves 5 and 6 of the carrier 4 are as phase conductors of a superconductive cable electric conductors 7 and 8 of superconductive material. The construction thereof is apparent from the more detailed illustration of FIGS. 3 and 4. Around the carrier 4 is mounted on its entire axial length preferably a holding helix 9 of insulating material through which the conductor 7 and 8 are prevented from moving out of the grooves 5 and 6. In addition, closing elements 10 and 11 composed of insulating material can also be placed radially over the conductor 7 and 8 in the grooves 5 and 6 which may possibly also be surrounded by the holding helix 9. The holding helix 9 and the closing elements 10 and 11 are composed advantageously of the same material as the carrier 4.

The carrier 4 is illustrated in FIG. 1 as a solid strand. However, in accordance with FIG. 2, it may also be constructed as a pipe through which during operation of the cable the cooling agent conducted in the free space FR can be also or additionally conducted through. The other construction of the carrier 4 according to FIG. 2 corresponds to that of the carrier of FIG. 1.

Figures 3, 4:
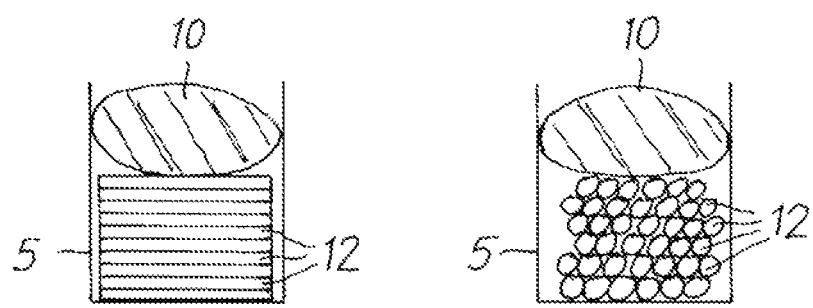
FIGS. 3 and 4 show details of the cable according to FIG. 1 or 2 on a larger scale.

The conductors 7 and 8 of the cable are each composed of a plurality of superconductive elements with small cross sectional dimensions, as can be seen in FIGS. 3 and 4.

The superconductive elements 12 of the conductors 7 and 8 can be constructed in accordance with FIG. 3 as flat strips which are arranged lying on top of each other in a stack. They can be held together by a band loosely wound around the stack. This is also true in the embodiment of conductors 7 and 8 according to FIG. 4 in which a unit of round wires is placed as superconductive elements 12.

The description provided above is also applicable, as already mentioned, to cables with more than two superconductive conductors 7 and 8, wherein the number of conductors is always a whole number multiple of "2".

The invention claimed is:

1. Superconductive electrical direct current cable comprising:
   a cryostat suitable for conducting a cooling agent made of at least one metal pipe surrounded by a circumferentially closed layer with thermal insulating properties;
   at least two superconductive conductors of different DC phases insulated relative to each other, are mounted in said cryostat; and
   a strand-shaped carrier of insulating material arranged within the cryostat has at least two helically extending grooves located diametrically opposite each other for insulating said at least two superconductive conductors of different DC phases,
   wherein the helically extending grooves are open outwardly, and in each groove is arranged one of the superconductive conductors, wherein each superconductive conductor is composed of a variably numbered plurality of superconductive elements.

2. Cable according to claim 1, further comprising a holding helix of insulating material that is wound around the carrier for retaining said superconducting conductors in their respective helically extending grooves.

3. Cable according to claim 2, wherein said holding helix is made from the same material as said carrier.

4. Cable according to claim 1, wherein the helically extending grooves further include closing elements of insulating material within said grooves placed radially over the superconducting conductors.

5. Cable according to claim 4, wherein said closing elements is made from the same material as said carrier.

6. Cable according to claim 1, wherein the superconductive conductors are flat strips.

7. Cable according to claim 1, wherein the superconductive conductors are round wires.

8. Cable according to claim 1, wherein the carrier is solid.

9. Cable according to claim 1, wherein the carrier has a hollow center.

* * * * *